Figure 4:
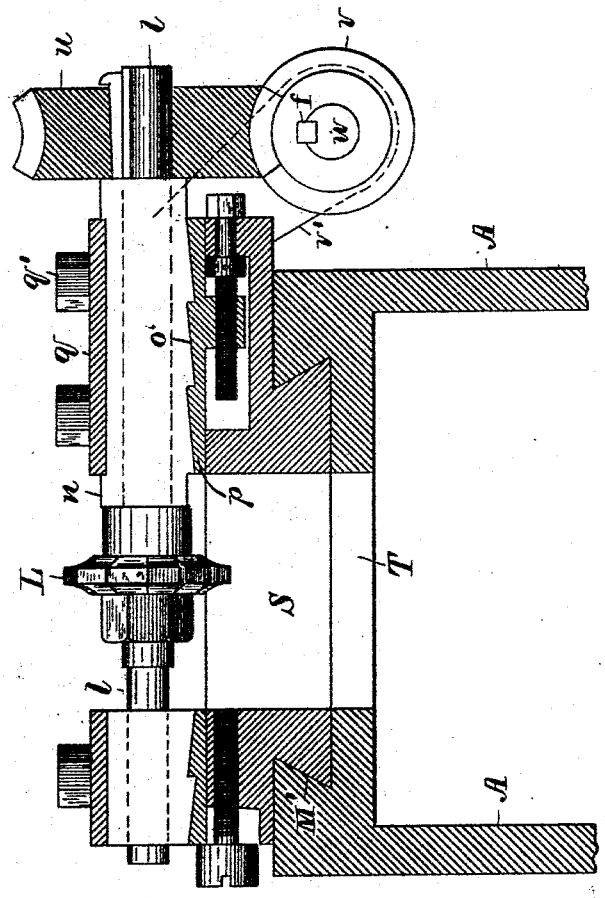

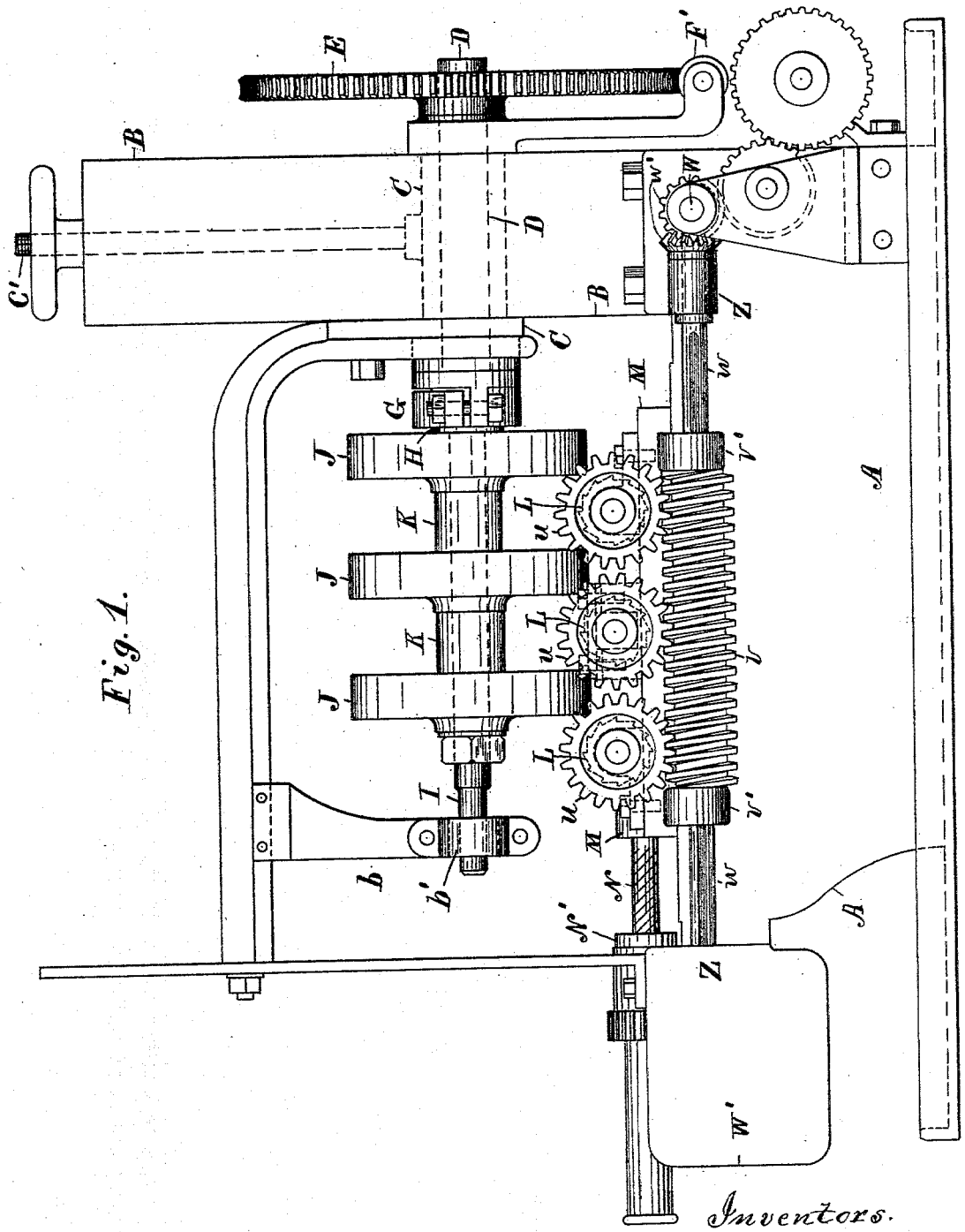

(No Model.) 3 Sheets—Sheet 2.
U. & H. E. EBERHARDT.
MULTIPLEX GEAR CUTTER.
No. 515,906. Patented Mar. 6, 1894.
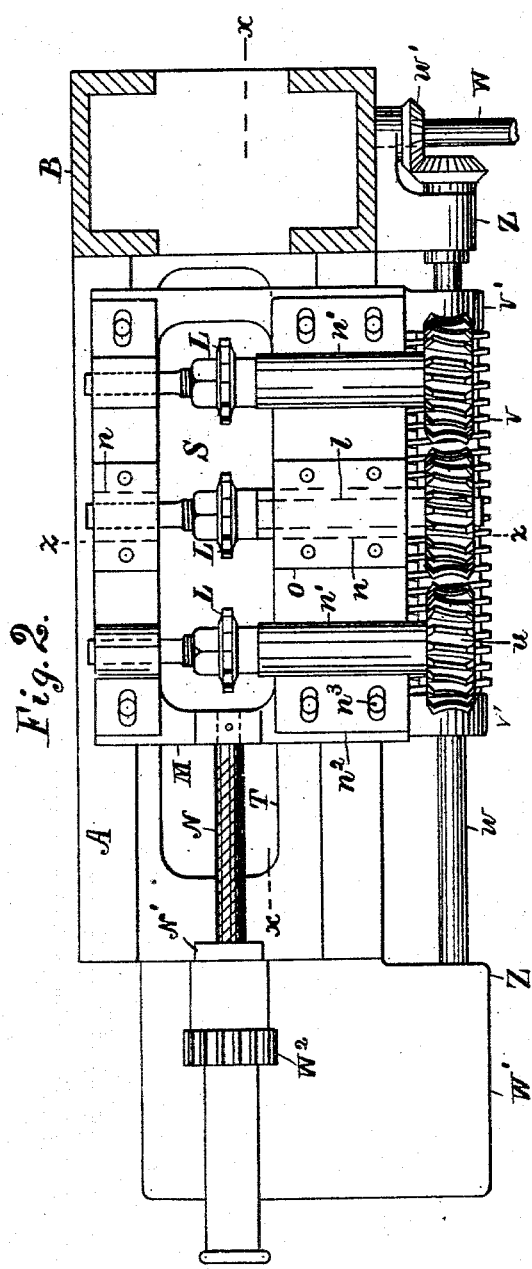
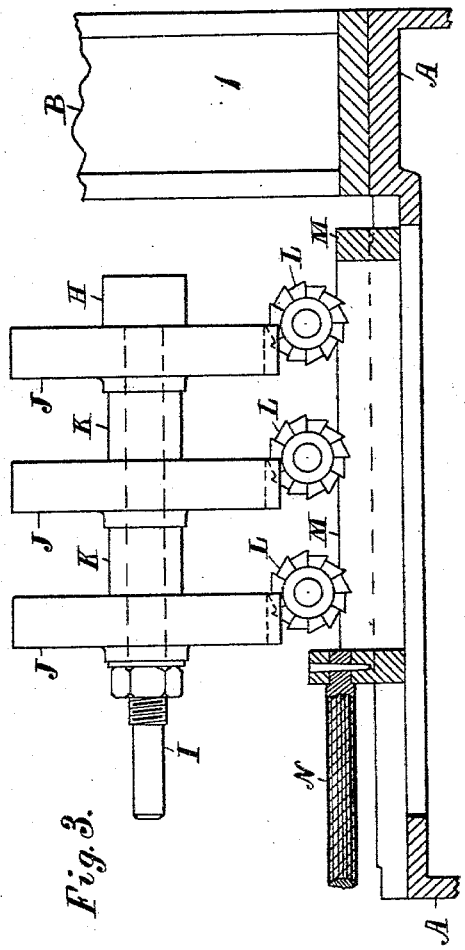
Attest:
Edw. F. Kinsey
W. Batson
Inventors.
Ulrich Eberhardt and
Henry E. Eberhardt, per
Crane & Miller, Attys.

(No Model.)   U. & H. E. EBERHARDT.   3 Sheets—Sheet 3.
MULTIPLEX GEAR CUTTER.

No. 515,906.   Patented Mar. 6, 1894.

Attest:
Edw. G. Kinsey.
W. Batson.

Inventors.
Ulrich Eberhardt and
Henry E. Eberhardt, per
Crane & Miller, Attys.

UNITED STATES PATENT OFFICE.

ULRICH EBERHARDT AND HENRY E. EBERHARDT, OF NEWARK, NEW JERSEY.

MULTIPLEX GEAR-CUTTER.

SPECIFICATION forming part of Letters Patent No. 515,906, dated March 6, 1894.

Application filed May 5, 1893. Serial No. 473,090. (No model.)

*To all whom it may concern:*

Be it known that we, ULRICH EBERHARDT and HENRY E. EBERHARDT, citizens of the United States, residing at Newark, Essex county, New Jersey, have invented certain new and useful Improvements in Multiplex Gear-Cutters, fully described and represented in the following specification and the accompanying drawings, forming a part of the same.

This invention relates to that class of gear cutters in which two or more blanks are operated upon simultaneously; and the invention consists in the improvements herein shown and described.

The invention will be understood by reference to the annexed drawings, in which—

Figure 1 is a side elevation of the parts of a gear cutter directly related to the present improvements. Fig. 2 is a plan of the same. Fig. 3 is a diagram showing the mandrel with the blanks thereon, and a section of the cutter head and bed on line $x, x$, in Fig. 2; and Fig. 4 is a cross section of the bed and cutter head on line $z, z$, in Fig. 2, with the adjacent spindle and bearings within their boxes, and the worm and worm wheel in section at the center line of the spindle.

The machine shown is of the type shown in the patent application Serial No. 442,075, filed August 3, 1892, by us jointly with F. L. Eberhardt, having a horizontal bed A with vertical column B at one end, carrying a mandrel head C for rotating the mandrel which carries the blanks. The head is provided, as is usual, with a rotary sleeve D; upon the outer end of which a worm wheel E is fastened and rotated by worm F'. The sleeve is shown provided upon its outer end with a clutch G adapted to embrace a collar H upon the end of the mandrel I, as shown in Fig. 1. The mandrel is shown with three blanks J secured upon the same, with intermediate bushings K which hold the centers of the blanks at the same distance as the series of cutters L. The cutter spindles $l$ are mounted in bearings upon a cutter head M, to the outer end of which a feed screw N is attached, which would be actuated by a rotary nut N' to reciprocate the cutter head to and from the column B.

The cutter head is shown in Fig. 4 fitted to the bed A by dove tails M', and a slot S is shown extended through the carriage, coincident with a slot T in the bed A, to permit the chips to fall freely away from the cutters. Three spindles $l$ are shown mounted upon the cutter head, the central spindle being fitted to boxes $n$ which are rectangular in shape and fitted between transverse lugs $o$ upon the carriage. The bottoms of the boxes $n$ are provided with sloping seats $o'$, and wedges $p$ are fitted beneath the same to adjust them vertically by a longitudinal movement of such wedges. The boxes are clamped upon the wedges by caps $q$ and bolts $q'$. The other two spindles are mounted in bearings $n'$ having feet $n^2$ provided with slots through which bolts $n^3$ are fitted. By such slotted feet, the bearings may be adjusted to and from the central bearing $n$. The centers of the spindles are shown adjusted at the same distance apart as the centers of the blanks J.

To drive the cutter spindles simultaneously, worm wheels $u$ are applied to their outer ends, and a single worm $v$ is mounted between bearings $v'$ upon the cutter head. A shaft $w$ is extended through the worm and the bearings $v'$, and is grooved to receive a feather $f$ in the worm, as shown in Fig. 4. The feather rotates the worm when the carriage is reciprocated back and forth upon the bed. The shaft is connected, by bevel gears $w'$ at one end, with a driving shaft W, which would be provided with a driving pulley. The opposite end of the shaft is inserted in a casing W' in which it would be connected by reversible gearing with a cog wheel $W^2$ upon the rotary nut N'.

The means for rotating the shaft W and for connecting the shaft $w$ with the rotary nut, is not shown herein, as they form no part of the present invention, and are fully shown in the aforesaid application. It will be readily seen that the worm operates to rotate all the spindles in the same direction to cut the corresponding number of blanks simultaneously, and that the motion of the worm is imparted to the spindles irrespective of the position of the carriage M upon the bed A.

The teeth of the worm and worm wheel are preferably made quite coarse, to permit a slight vertical adjustment of any of the spindles, to compensate for any wear of the cutter without affecting the operation of the worm.

In Fig. 1 the cutters are shown set each at one side of the blank ready to cut the same; which is effected by moving the carriage M from the column B by means of the feed screw N. By reversing the operation of the feed screw, as is common in such machines, the carriage is fed at a suitable rate toward the column, thus moving the cutter toward the blanks into the position shown in Fig. 3. In such position, the cutter has completely formed the groove through the blank, and may be retracted to its intermediate position, to permit the shifting of the blank. The blank is then shifted by a suitable actuation of the worm wheel E into the proper position to cut another notch, and the series of cutters is then fed into the blanks, and the succeeding notch is produced, which completes a tooth upon the blank. It is obvious that the stroke or reciprocating movement of the carriage may be made as great as is needful, to cut each of the blanks and to retract the cutters therefrom for shifting the blank; but to bring the cutters into operation upon the series of blanks simultaneously, the outer faces of the blanks or their centers should be spaced upon the mandrel I at the same distances as the cutter spindles are spaced upon the cutter head. To effect such adjustment of the blanks, bushings K are fitted upon the mandrel I between the several blanks, and such bushings may be made of suitable length to suit blanks of any thickness to secure the required adjustment. This method of operation is applicable chiefly to cutting simultaneously a series of blanks of the same diameter and pitch, in which case it is obvious that each cutter must penetrate each blank to the same depth. To permit the vertical adjustment of the cutter in any case where one cutter differs slightly in size from another in the series, or in case one cutter wears more than another during protracted use; blocks $p$ (Fig. 4) are shown interposed between the spindle bearings $n$ and the cutter head $m$, having inclined seats $o'$ fitted to notches in the under side of the bearings. Such a block is shown at the right in Fig. 4 provided upon its under side with a lug through which is inserted an adjusting screw swiveled in the side of the cutter head; and at the left in the same figure the adjusting screw is inserted in the side of the cutter head adjacent to the block with one side of its head engaging the lower corner of the block. By turning such adjusting screws the blocks $p$ are forced inward toward the cutter and thus operate to elevate the spindle bearing and the members carried thereby. The slotted feet $n^2$ of the bearings $n'$ permit the lateral adjustment of the spindles, when required, to correspond with the centers of the blanks. Suitable means may be applied to any of the spindles for adjusting them vertically and laterally, and such means obviously permits one cutter to operate upon a blank materially smaller in diameter than another. It is obvious that any cutter in the series may be made larger than the others to operate upon a smaller blank, or smaller than the others to operate upon a larger blank, and blanks of different sizes may thus be cut simultaneously without varying the vertical position of the spindles. By mounting the shaft $w$, transverse to the spindle $l$, in fixed bearings Z upon the gear cutter frame and connecting it by suitable gearing with the power shaft W, it is adapted to actuate all the spindles upon the movable cutter head without the employment of any devices for holding a driving belt tight in various positions.

The use of a shaft W in fixed bearings, and its connection with the spindles in the manner described, enables us to drive all the spindles by the use of a single pulley upon the shaft W, as claimed in the application Serial No. 442,075.

It is immaterial how the shaft $w$ be geared to the spindle N, and other means besides the worm $v$ may be employed, as is shown in the said application.

The drawings show an outboard bearing $b$ with split box $b'$, applied to the outer end of the mandrel I; as claimed in the application Serial No. 442,075; by which means the mandrel with the blanks thereon can be removed laterally from the chuck G. By this means the blanks can be set between the several cutters L before the cutting is commenced; without shifting the mandrel head C by means of the screw C' shown in Fig. 1. No resetting of the mandrel head is therefore required for cutting any number of blanks of the same diameter.

The worm $v$ and the worm wheels $u$ may be cased to protect the operator and the casing supplied with oil to lubricate the wheels. It is immaterial whether the worm be made movable with the carriage M, as a worm much longer than the carriage, and fixed to the shaft $w$ would operate with the wheels $u$ throughout their entire range of movement. It is also immaterial whether the cutter spindles have bearings at both ends, as all the adjustments required may be applied to the bearings next the wheels $u$.

Having thus set forth the invention, what is claimed herein is—

1. In a gear cutter, the combination, with the horizontal bed A and the vertical column B carrying the vertically adjustable mandrel head C, of the mandrel I carried by such mandrel head with means for interspacing a series of blanks upon the mandrel, a cutter head movable upon the bed parallel with the mandrel, a series of spindles mounted in bearings upon the cutter head with cutters adjusted to cut the blanks simultaneously, the shaft $w$ transverse to the spindles, and gearing connecting the shaft $w$ with the spindles, substantially as herein set forth.

2. In a gear cutter, the combination, with a movable cutter head, of a series of transverse spindles carrying the cutters and provided each with a worm wheel, bearings upon the cutter head carrying a worm shaft transverse to the spindles, a worm fitted by a spline to such worm shaft and movable longitudinally thereon, and means for driving the worm shaft, as herein shown and described.

3. In a gear cutter, the combination, with a vertically adjustable mandrel carrying a series of blanks, and the movable cutter head M, of the series of transverse cutter spindles, bearings for one of such spindles adjustable vertically upon the cutter head, and bearings for the adjacent spindles adjustable laterally upon the cutter head, as and for the purpose set forth.

In testimony whereof we have hereunto set our hands in the presence of two subscribing witnesses.

ULRICH EBERHARDT.
HENRY E. EBERHARDT.

Witnesses:
THOMAS S. CRANE,
JOSEPH B. PIERSON.